US012791310B2

(12) United States Patent
Ando et al.

(10) Patent No.: US 12,791,310 B2
(45) **Date of Patent: *Nov. 10, 2026**

(54) DEFORMATION AMOUNT DETECTION DEVICE

(71) Applicant: Murata Manufacturing Co., Ltd., Nagaokakyo (JP)

(72) Inventors: Masamichi Ando, Nagaokakyo (JP); Kenichi Mori, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/628,987

(22) Filed: Apr. 8, 2024

(65) Prior Publication Data

US 2024/0255282 A1 Aug. 1, 2024

Related U.S. Application Data

(63) Continuation of application No. 17/876,013, filed on Jul. 28, 2022, now Pat. No. 11,982,524, which is a (Continued)

(30) Foreign Application Priority Data

Aug. 6, 2020 (JP) ................................ 2020-133888

(51) Int. Cl.
*G01B 17/04* (2006.01)
*G01B 7/16* (2006.01)
*G06F 1/16* (2006.01)

(52) U.S. Cl.
CPC ............... *G01B 17/04* (2013.01); *G01B 7/16* (2013.01); *G06F 1/1616* (2013.01); *G06F 1/1677* (2013.01)

(58) Field of Classification Search
CPC ......... G01B 17/04; G01B 7/16; G06F 1/1616; G06F 1/1677
See application file for complete search history.

(56) References Cited

U.S. PATENT DOCUMENTS 3,978,731 A * 9/1976 Reeder .................. G10K 11/36 331/65
4,564,782 A * 1/1986 Ogawa .................. H03H 9/562 310/366

(Continued)

FOREIGN PATENT DOCUMENTS

CN 109427975 A 3/2019
JP 2003256135 A 9/2003

(Continued)

OTHER PUBLICATIONS

Translation of JP2012-185131.*
International Search Report in PCT/JP2021/028100, mailed Oct. 26, 2021, 3 pages.

*Primary Examiner* — Helen C Kwok
(74) *Attorney, Agent, or Firm* — ArentFox Schiff LLP

(57) ABSTRACT

An input includes a first electrode and a first deformation portion. An output includes a second electrode and a second deformation portion. A transmission portion enables transmission of an elastic wave from the first deformation portion to the transmission portion and transmission of an elastic wave from the transmission portion to the second deformation portion. In operation, an input signal is input to the first electrode that deforms the first deformation portion to generate an elastic wave. The transmission portion transmits the elastic wave from the first deformation portion to the second deformation portion that is deformed by the elastic wave to generate an output signal to the second electrode. The (Continued)

detection unit detects a deformation amount from the reference state of the transmission portion based on the output signal.

20 Claims, 5 Drawing Sheets

Related U.S. Application Data continuation of application No. PCT/JP2021/028100, filed on Jul. 29, 2021.

(56) References Cited

U.S. PATENT DOCUMENTS 8,525,619 B1 * 9/2013 Olsson ............... H03H 9/02228 333/187
11,982,524 B2 * 5/2024 Ando ..................... G01B 17/04
2010/0164324 A1 * 7/2010 Kim ..................... H10N 30/802 310/318
2010/0282005 A1 * 11/2010 Kwon ................ G01N 29/2437 73/865
2012/0075226 A1 * 3/2012 Andoh .................. G06F 3/0416 345/173
2012/0304778 A1 * 12/2012 Nakamura .............. G01L 5/228 73/778
2014/0049137 A1 * 2/2014 Ando ....................... G01B 7/16 310/330
2015/0153880 A1 * 6/2015 Ando .................. G06F 3/04144 345/174
2016/0282204 A1 9/2016 Haines et al.
2018/0004357 A1 * 1/2018 Elsherbini ................ H03H 9/25
2018/0248105 A1 * 8/2018 Van Den Ende .... H10N 30/302
2019/0089330 A1 * 3/2019 Saji .................... H03H 9/02559
2019/0267995 A1 * 8/2019 Du ....................... H10N 30/302
2019/0383695 A1 * 12/2019 Yao ........................... G01L 1/16
2021/0223035 A1 * 7/2021 Liang .................. H01L 27/1259
2021/0333774 A1 10/2021 Tada
2022/0034711 A1 2/2022 Hara et al.
2022/0099437 A9 3/2022 Liang
2022/0307926 A1 9/2022 Mori

FOREIGN PATENT DOCUMENTS

JP 2012185131 A * 9/2012
JP 5658061 B2 1/2015
JP 2018080958 A 5/2018
JP 6578499 B1 9/2019

* cited by examiner

DEFORMATION AMOUNT DETECTION DEVICE

CROSS REFERENCE TO RELATED APPLICATIONS

This application is a continuation of U.S. patent application Ser. No. 17/876,013, filed Jul. 28, 2022, which is a continuation of PCT Application No. PCT/JP2021/028100, filed Jul. 29, 2021, which claims priority to Japanese Patent Application No. 2020-133888, filed Aug. 6, 2020, the entire contents of each of which are hereby incorporated by reference in their entirety.

TECHNICAL FIELD

The present invention relates to a deformation amount detection device.

BACKGROUND

An example of a rotary encoder is described in Japanese Patent No. 6578499 (hereinafter "Patent Document 1"), and an example of a gyro sensor is described in Japanese Patent Application Laid-Open No. 2018-080958 (hereinafter "Patent Document 2"). The rotary encoder described in Patent Document 1 and the gyro sensor described in Patent Document 2 are applicable to, for example, a foldable smartphone in which a first screen and a second screen can be folded. That is, an angle formed between the first screen and the second screen can be detected by the rotary encoder described in Patent Document 1 and the gyro sensor described in Patent Document 2.

However, there is still a demand for such a detection device that can detect a positional relationship between two members such as a first screen and a second screen.

SUMMARY OF THE INVENTION

Accordingly, it is an object of the present invention to provide a deformation amount detection device configured to detect a positional relationship between two members.

In an exemplary aspect, a deformation amount detection device is provided that includes an input including a first electrode and a first deformation portion; an output including a second electrode and a second deformation portion; and a transmission portion enabling transmission of an elastic wave from the first deformation portion to the transmission portion and transmission of an elastic wave from the transmission portion to the second deformation portion. Moreover, the transmission portion has flexibility that allows the transmission portion to be deformed from a reference state. The deformation amount detection device further includes a detection unit. In operation, an input signal is input to the first electrode, the first deformation portion is deformed by the input signal to generate an elastic wave, the transmission portion transmits the elastic wave from the first deformation portion to the second deformation portion, the second deformation portion is deformed by the elastic wave to generate an output signal to the second electrode, and the detection unit then is configured to detect a deformation amount from the reference state of the transmission portion based on the output signal.

Moreover, according to another exemplary aspect, a deformation amount detection device is provided that includes an input including a first electrode and a first deformation portion; and a transmission portion enabling transmission of an elastic wave from the first deformation portion to the transmission portion and transmission of a reflection wave of the elastic wave from the transmission portion to the first deformation portion. In this aspect, the transmission portion has flexibility that allows the transmission portion to be deformed from a reference state. The deformation amount detection device further includes a detection unit. In the exemplary aspect, an input signal is input to the first electrode, the first deformation portion is deformed by the input signal to generate an elastic wave, the transmission portion transmits the elastic wave from the first deformation portion, as the reflection wave, to the first deformation portion, the first deformation portion is deformed by the reflection wave to generate an output signal to the first electrode, and the detection unit is then configured to detect a deformation amount from the reference state of the transmission portion based on the output signal.

According to the exemplary aspects of the present invention, a positional relationship can be detected between two members.

DETAILED DESCRIPTION

Figure 1:
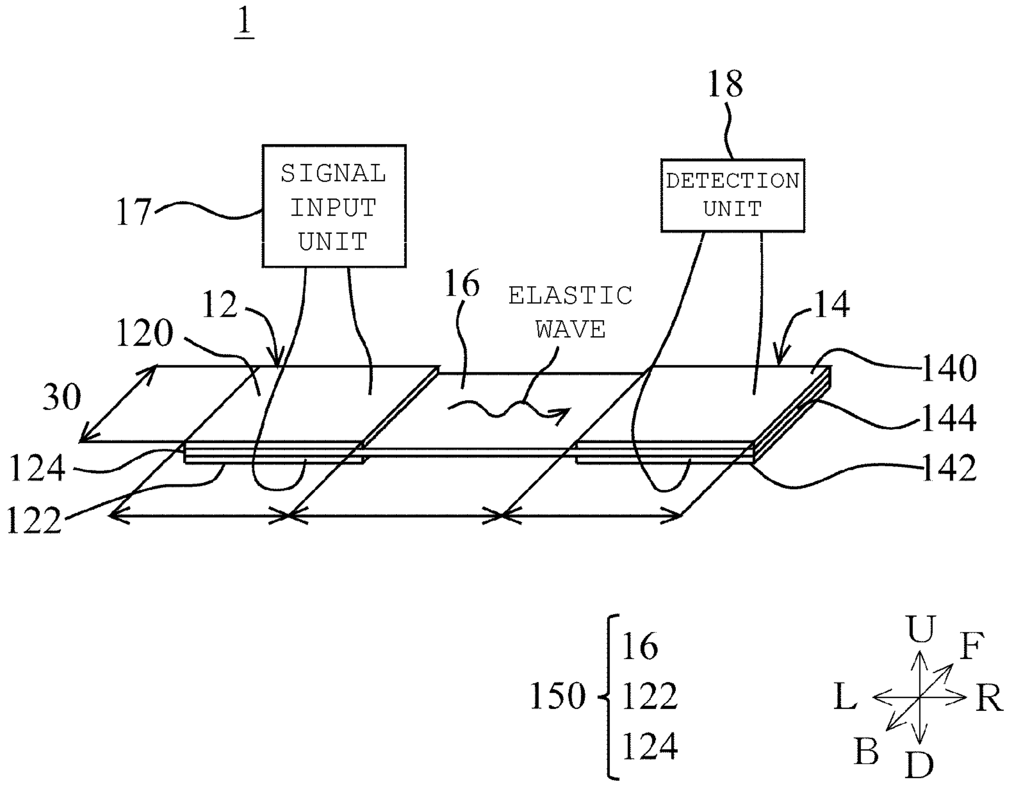
FIG. 1 is an external perspective view illustrating a deformation amount detection device 1.
Figure 2:
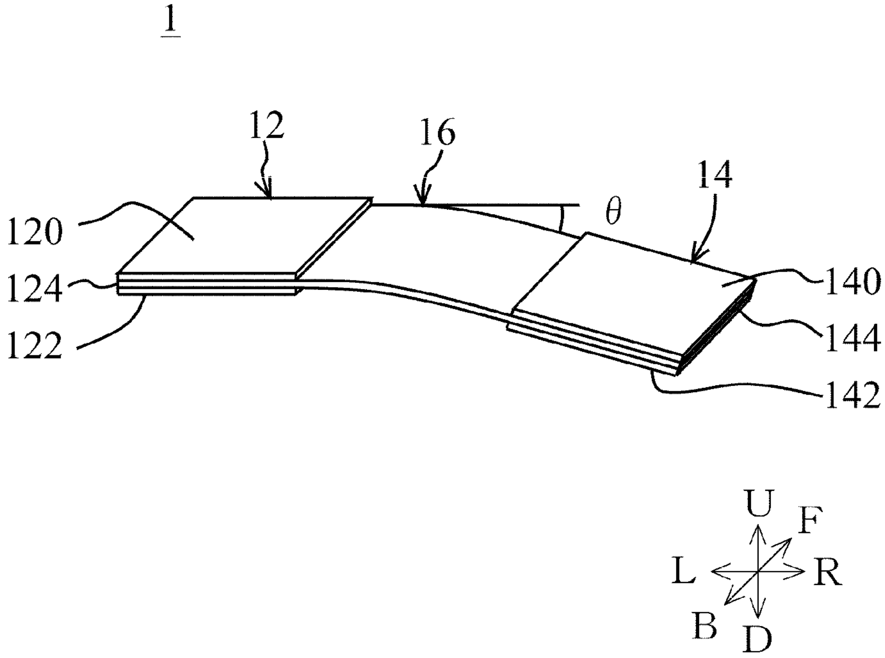
FIG. 2 is an external perspective view illustrating the deformation amount detection device 1.

Hereinafter, a deformation amount detection device 1 according to an exemplary embodiment will be described with reference to the drawings. FIGS. 1 and 2 are external perspective views each illustrating the deformation amount detection device 1. In FIG. 1, a transmission portion 16 of the deformation amount detection device 1 has a flat (e.g., planar) shape. The state of the transmission portion 16 as illustrated in FIG. 1 is referred to as the reference state. In FIG. 2, the transmission portion 16 is bent downward from the reference state.

Hereinafter, directions are defined as follows for purposes of this disclosure. The direction normal to the transmission portion 16 in the reference state is defined as the up-down direction. The direction in which the long sides of the deformation amount detection device 1 extend, when viewed in the up-down direction, is defined as the left-right direction. The direction in which the short sides of the deformation amount detection device 1 extend, when viewed in the up-down direction, is defined as the front-back direction. As shown, the up-down direction, the left-right direction, and the front-back direction are orthogonal to each other. It should be appreciated that the directions used herein need not coincide with directions when the deformation amount detection device 1 is used.

According to the exemplary aspect, the deformation amount detection device 1 is configured to detect a deformation amount from the reference state of the transmission portion 16. More particularly, in the present embodiment, the deformation amount detection device 1 detects an angle $\theta$ formed when the transmission portion 16 is bent, as illustrated in FIG. 2. The angle $\theta$ is, for example, an angle formed by an upper main surface of an input portion 12 (also referred to as an "input") and an upper main surface of an output portion 14 (also referred to as an "output"), described later. Such a deformation amount detection device 1 is applicable to, for example, a foldable smartphone in which a first screen and a second screen can be folded. That is, the deformation amount detection device 1 can detect an angle θ formed by the first screen and the second screen. The deformation amount detection device 1 is also applicable to a game controller, a joint of a robotic arm, or the like. When the deformation amount detection device 1 is applied to a game controller, the deformation amount detection device 1 detects an operation amount of the controller generated through operation by a user. When the deformation amount detection device 1 is applied to a joint of a robotic arm, the deformation amount detection device 1 detects a bending amount regarding the joint of the robotic arm.

As illustrated in FIG. 1, the deformation amount detection device 1 includes the input portion 12, the output portion 14, the transmission portion 16, a signal input unit 17, and a detection unit 18. The input portion 12 includes a first electrode 120, a third electrode 122, and a first deformation portion 124. The first electrode 120 and the third electrode 122 are conductor layers each having a rectangular shape when viewed in the up-down direction. The outer edge of the first electrode 120 and the outer edge of the third electrode 122 coincide with each other when viewed in the up-down direction. Each of the first electrode 120 and the third electrode 122 is, for example, an inorganic electrode such as indium tin oxide (ITO) or zinc oxide (ZnO), an organic electrode such as PeDOT or conductive polyaniline, a metal coating film formed by vapor deposition or plating, or a printed electrode film formed by silver paste.

The first deformation portion 124 is provided (e.g., sandwiched) between the first electrode 120 and the third electrode 122. More specifically, the first deformation portion 124 is a layer having a rectangular shape when viewed in the up-down direction. The first deformation portion 124 has an upper main surface and a lower main surface. The first electrode 120 is provided on the upper main surface of the first deformation portion 124. The third electrode 122 is provided on the lower main surface of the first deformation portion 124. A material of the first deformation portion 124 in an exemplary aspect will be described later.

The output portion 14 includes a second electrode 140, a fourth electrode 142, and a second deformation portion 144. The second electrode 140 and the fourth electrode 142 are conductor layers each having a rectangular shape when viewed in the up-down direction. The outer edge of the second electrode 140 and the outer edge of the fourth electrode 142 coincide with each other when viewed in the up-down direction. Each of the second electrode 140 and the fourth electrode 142 is, for example, an inorganic electrode such as indium tin oxide (ITO) or zinc oxide (ZnO), an organic electrode such as PeDOT or conductive polyaniline, a metal coating film formed by vapor deposition or plating, or a printed electrode film formed by silver paste.

The second deformation portion 144 is provided (e.g., sandwiched) between the second electrode 140 and the fourth electrode 142. More specifically, the second deformation portion 144 is a layer having a rectangular shape when viewed in the up-down direction. The second deformation portion 144 has an upper main surface and a lower main surface. The second electrode 140 is provided on the upper main surface of the second deformation portion 144. The fourth electrode 142 is provided on the lower main surface of the second deformation portion 144. A material of the second deformation portion 144 in an exemplary aspect will be described later.

The transmission portion 16 enables transmission of an elastic wave from the first deformation portion 124 to the transmission portion 16, and transmission of the elastic wave from the transmission portion 16 to the second deformation portion 144. Thus, the transmission portion 16 is connected to (e.g. between) the first deformation portion 124 and the second deformation portion 144. In the present embodiment, the first deformation portion 124, the second deformation portion 144, and the transmission portion 16 are formed as a single film 150. A material of the film 150 (a material of each of the first deformation portion 124, the second deformation portion 144, and the transmission portion 16) is, for example, a piezoelectric material in the exemplary embodiment. Hereinafter, the film 150 will be described in more detail.

The film 150 has characteristics in which polarity of output voltage generated when the film 150 is stretched in the left-right direction is polarity reverse to that of output voltage generated when the film 150 is stretched in the front-back direction. Specifically, the material of the film 150 is a chiral polymer. The chiral polymer is, for example, polylactic acid (PLA), particularly poly-L-lactic acid (PLLA). PLLA, which is a chiral polymer, has a main chain with a helical structure. PLLA has piezoelectricity in which molecules are oriented when uniaxial stretching is performed. The film 150 has a piezoelectric constant of $d_{14}$. A uniaxial stretching direction (e.g., an orientation direction) of the film 150 is preferably set in accordance with constituent materials of the deformation amount detection device 1 and a target of deformation amount detection, and is preferably set such that responsiveness of an electrical parameter of an output signal with respect to a deformation amount is improved.

Moreover, in the exemplary aspect, the transmission portion 16 has a flexibility that allows the transmission portion 16 to be deformed from the reference state. As illustrated in FIG. 1, the transmission portion 16 in the reference state has a flat shape. The transmission portion 16 can be bent upward or downward. The transmission portion 16 can also be twisted about a straight line extending along the left-right direction.

The signal input unit 17 generates an input signal (e.g. a sound signal) whose voltage periodically changes. The input signal has amplitude and frequency set by a designer at the time of design. The frequency of the input signal is, for example, within a range from audible sound to ultrasound. The signal input unit 17 applies the input signal to the first electrode 120 and the third electrode 122. As a result, the input signal, whose voltage periodically changes, is input between the first electrode 120 and the third electrode 122.

The first deformation portion 124 is deformed by the input signal to generate an elastic wave. More specifically, the input signal is a signal whose voltage periodically changes. Thus, the first deformation portion 124 repeats stretching and compression in the left-right direction. As a result, the first deformation portion 124 generates the elastic wave. The transmission portion 16 transmits the elastic wave from the first deformation portion 124 to the second deformation portion 144.

The second deformation portion 144 is deformed by the elastic wave to generate an output signal between the second electrode 140 and the fourth electrode 142. More specifically, the second deformation portion 144 repeats stretching and compression in the left-right direction when the elastic wave is transmitted. Thus, the second deformation portion 144 is configured to generate the output signal whose voltage periodically changes.

In operation, excitation can be generated by the input signal in accordance with a form of the deformation amount detection device 1. Thus, the sizes in the left-right direction of the second electrode 140 and the fourth electrode 142 are set near an excitation wavelength. Thus, amplitude of the output signal can be increased. When the amplitude of the output signal is increased, improvement of S/N is achieved, and accuracy of detection of the angle θ, described later, is increased.

The detection unit 18 detects a deformation amount from the reference state of the transmission portion 16 based on the output signal. In the present embodiment, the detection unit 18 is configured to detect the angle θ (see FIG. 2) formed when the transmission portion 16 is bent, based on the amplitude of the output signal. The detection unit 18 is, for example, a central processing unit (CPU). Hereinafter, details will be described.

Amplitude of an elastic wave having specific frequency that is output from the transmission portion 16 in a bent state as illustrated in FIG. 2 to the second deformation portion 144 is different from amplitude of an elastic wave having specific frequency that is output from the transmission portion 16 in the reference state to the second deformation portion 144. The reason will be described using a musical saw as an example. When playing of a musical saw is performed, a player can change pitch of sound generated from the musical saw by changing a bending amount of the musical saw. This can be achieved because when the musical saw is bent, length of a vibrating region in the musical saw changes, and thus resonance frequency of the musical saw also changes. That is, when the bending amount of the musical saw changes, the frequency of the sound generated from the musical saw shifts. When focusing on amplitude of sound with specific frequency, the amplitude of the sound having the specific frequency fluctuates along with the bending of the musical saw. That is, a correlation is established between the amplitude of the sound with specific frequency and the bending amount of the musical saw. The present inventors focused on this correlation and determined that the amplitude, of the elastic wave having specific frequency, that is output from the transmission portion 16 in the reference state to the second deformation portion 144 is different from the amplitude, of the elastic wave having specific frequency, that is output from the transmission portion 16 in the bent state as illustrated in FIG. 2 to the second deformation portion 144. Then, the present inventors considered that a deformation amount from the reference state of the transmission portion 16 can be obtained by comparing these two types of amplitude.

Figure 3:
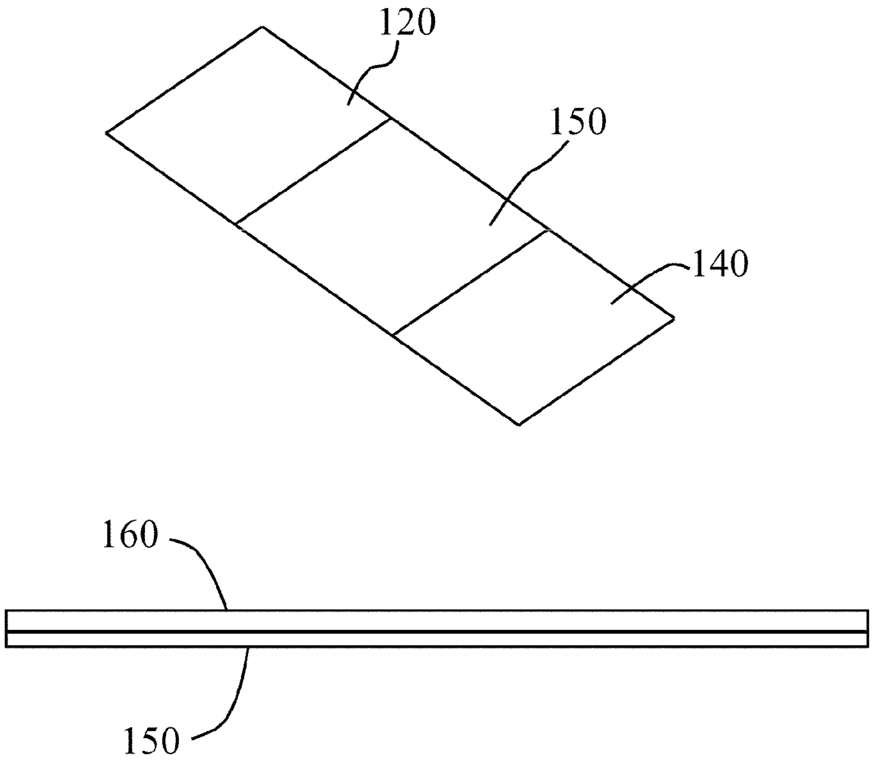
FIG. 3 is a diagram illustrating a model used in a first computer simulation.
Figure 4:
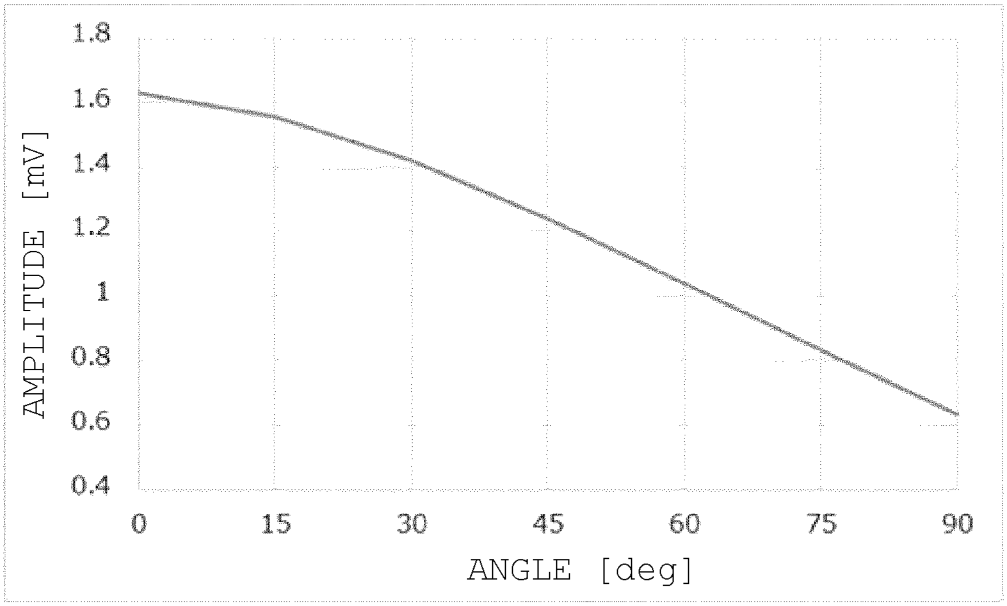
FIG. 4 is a graph illustrating a simulation result.

Therefore, the present inventors conducted a first computer simulation by using a finite element method, described below. FIG. 3 is a diagram illustrating a model used in the first computer simulation. In the model used in the first computer simulation, the third electrode 122 and the fourth electrode 142 are also included. However, in the drawing, illustration of the third electrode 122 and the fourth electrode 142 is omitted. In the first computer simulation, a substrate 160 was bonded to the film 150. Although not illustrated, the first electrode 120 and the second electrode 140 are positioned between the film 150 and the substrate 160. Conditions of the first computer simulation are as follows:

Material of film 150: piezoelectric poly-L-lactic acid
Thickness of film 150: 50 μm
Orientation direction of molecules of film 150: 22.5° with respect to the left-right direction
Material of substrate 160: PET
Thickness of substrate 160: 100 μm
Frequency of input signal: 100 kHz
Amplitude of input signal: 5 V The present inventors examined a relationship between amplitude of an output signal at 100 kHz and an angle θ, under the above conditions. FIG. 4 is a graph illustrating the simulation result. FIG. 4 illustrates the relationship between the amplitude of the output signal and the angle θ. The horizontal axis in FIG. 4 indicates the angle (in degree). The vertical axis in FIG. 4 indicates the amplitude (in mV).

As illustrated in FIG. 4, the amplitude of the output signal at 100 kHz decreases as the angle θ increases. Thus, the detection unit 18 can detect the angle θ based on the amplitude of the output signal. Specifically, the detection unit 18 stores a table corresponding to the graph in FIG. 4. The table illustrates the relationship between the amplitude of the output signal and the angle θ. When the detection unit 18 obtains the output signal, the detection unit 18 refers to the table to specify the angle θ. In this manner, the deformation amount detection device 1 can detect, for example, a positional relationship between a member connected to the input portion 12 and a member connected to the output portion 14.

In the deformation amount detection device 1, the signal input unit 17 can be configured to apply an input signal to the input portion 12 only at any timing when it is desirable to detect a deformation amount from the reference state of the transmission portion 16. Thus, power consumption can be reduced in the deformation amount detection device 1.

A value of the output signal is an absolute quantity, and is not a relative value. Thus, drift in the output signal due to repeated use of the deformation amount detection device 1 is reduced.

A sensor formed by the input portion 12, the output portion 14, and the transmission portion 16 is thin because the film 150 is used.

The material of the film 150 is polylactic acid, and thus an environmental load is small.

The detection unit 18 is configured to detect the angle θ as a deformation amount from the reference state of the transmission portion 16. However, the deformation amount from the reference state of the transmission portion 16 is not limited to the angle θ. The deformation amount from the reference state of the transmission portion 16 may be, for example, a twist angle of the transmission portion 16. Alternatively, the deformation amount from the reference state of the transmission portion 16 may be a stretching amount of the transmission portion 16 in the left-right direction. Alternatively, the deformation amount from the reference state of the transmission portion 16 may be a stretching amount of the transmission portion 16 in the front-back direction.

The detection unit 18 is configured to detect a deformation amount from the reference state of the transmission portion 16 based on amplitude of the output signal. However, the detection unit 18 may detect the deformation amount from the reference state of the transmission portion 16, based on an electrical parameter that is other than the amplitude of the output signal, and that is included in the output signal. The electrical parameter included in the output signal is, for example, frequency of the output signal. When the deformation amount from the reference state of the transmission portion 16 changes, resonance frequency in the transmission portion 16 also changes. In this case, the frequency of the output signal changes. Therefore, the detection unit 18 can detect the deformation amount from the reference state of the transmission portion 16 based on the frequency of the output signal. For example, the detection unit 18 may specify frequency having the highest intensity in the output signal by performing a sweep of the output signal. This will be described below.

The present inventors conducted a second computer simulation by using a finite element method, described below. In the second computer simulation, the same model was used as the model used in the first computer simulation described above. However, in the second computer simulation, frequency of the input signal was swept. In the second computer simulation, the orientation direction of the film 150 was set to 45 degrees. Conditions of the second simulation are as follows.

Material of film 150: piezoelectric poly-L-lactic acid

Thickness of film 150: 50 μm

Figure 5:
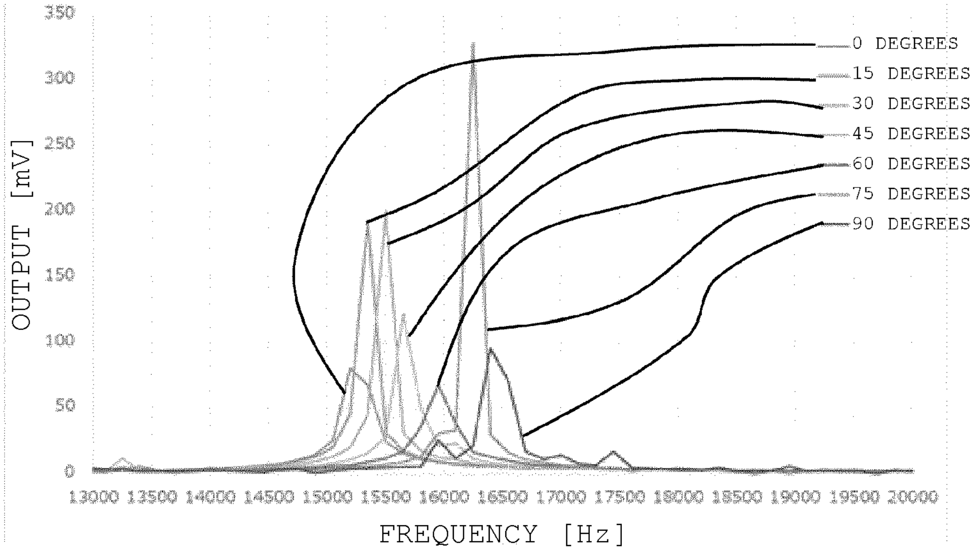
FIG. 5 is a graph illustrating a simulation result.
Figure 6:
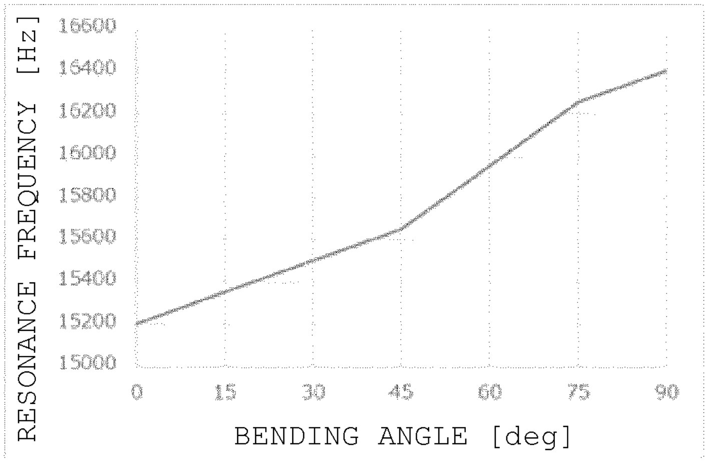
FIG. 6 is a graph illustrating a simulation result.

Orientation direction of molecules of film 150: 45° with respect to the left-right direction Material of substrate 160: PET Thickness of substrate 160: 100 μm Frequency of input signal: 13 kHz to 20 kHz Amplitude of input signal: 5 V The present inventors performed a sweep of the input signal under the above conditions, in the deformation amount detection device 1 where the angle θ is formed with a plurality of values. Then, the present inventors measured amplitude of the output signal for each value of the angle θ. FIGS. 5 and 6 are graphs illustrating the simulation results. FIG. 5 is a graph illustrating a relationship between the frequency (in Hz) of the input signal and the amplitude of the output signal (in mV). The horizontal axis in FIG. 5 indicates the frequency. The vertical axis in FIG. 5 indicates the amplitude. FIG. 6 is a graph illustrating a relationship between the angle θ and the resonance frequency. The horizontal axis in FIG. 6 indicates the bending angle θ (in degrees). The vertical axis in FIG. 6 indicates the resonance frequency (in Hz).

As illustrated in FIG. 5, the resonance frequency changes as the angle θ increases. The detection unit 18 can detect the angle θ based on the resonance frequency of the output signal. Specifically, the detection unit 18 stores a table corresponding to the graph in FIG. 6. The table illustrates the relationship between the resonance frequency of the output signal and the angle θ. When the detection unit 18 obtains the resonance frequency of the output signal, the detection unit 18 refers to the table to specify the angle θ. In this manner, the deformation amount detection device 1 can detect, for example, a positional relationship between a member connected to the input portion 12 and a member connected to the output portion 14.

An electrical parameter included in the output signal is, for example, a Q factor of the output signal. The Q factor of the output signal is a value obtained by dividing amplitude of the output signal in resonance frequency thereof by full width at half maximum. When a deformation amount from the reference state of the transmission portion 16 changes, the resonance frequency of the output signal changes. In this case, the Q factor of the output signal changes. Therefore, the detection unit 18 can detect the deformation amount from the reference state of the transmission portion 16 based on the Q factor of the output signal. The detection unit 18 can be configured to detect the deformation amount from the reference state of the transmission portion 16 based on a plurality of electrical parameters of the output signal.

When a deformation amount from the reference state of the transmission portion 16 changes, a transmission speed of an elastic wave also changes. Thus, the detection unit 18 can detect the deformation amount from the reference state of the transmission portion 16 based on a time period from when the input signal is input to when the output signal is output.

In an exemplary aspect, a material of the film 150 (a material of each of the first deformation portion 124, the second deformation portion 144, and the transmission portion 16) can be polyvinylidene fluoride. The film 150 may be produced by sputtering an inorganic piezoelectric material (for example, aluminum nitride) on a non-piezoelectric film.

The first deformation portion 124, the second deformation portion 144, and the transmission portion 16 may not be formed as a single film 150. The transmission portion 16 only needs to be able to transmit an elastic wave, and does not need to be able to be deformed by an electrical signal. In this case, the transmission portion 16 may be thin sheet metal such as stainless steel, an aluminum-based alloy, or a copper-based alloy. Alternatively, a PET film, or a film formed of polycarbonate (PC) or acrylic (PMMA) may be used. In this case, the transmission portion 16 does not have piezoelectricity, and thus each of the first deformation portion 124 and the second deformation portion 144 further includes an input member or an output member for an elastic wave formed of PLLA, polyvinylidene fluoride, or a ceramic-based piezoelectric material such as PZT. For example, when the transmission portion 16 is a PET film, the input portion 12 is attached to a left end portion of an upper main surface of the transmission portion 16. The output portion 14 is attached to a right end portion of the upper main surface of the transmission portion 16. Also in such a deformation amount detection device 1, an elastic wave generated in the input portion 12 is transmitted to the output portion 14 through the transmission portion 16. Alternatively, the transmission portion 16 may be a substrate of a flexible display. In this case, the input portion 12 and the output portion 14 are attached to the substrate of the flexible display.

For purposes of this disclosure, it is noted that the description, "the transmission portion 16 enables transmission of an elastic wave from the first deformation portion 124 to the transmission portion 16, and transmission of the elastic wave from the transmission portion 16 to the second deformation portion 144" is not limited to a case where the transmission portion 16, the first deformation portion 124, and the second deformation portion 144 are formed of a single sheet. For example, in another exemplary aspect, the transmission portion 16 can be in contact with the first deformation portion 124 and the second deformation portion 144. Alternatively, the transmission portion 16 can be fixed to the first deformation portion 124 with another member interposed therebetween, and can be fixed to the second deformation portion 144 with another member interposed therebetween. In this case, the transmission portion 16 is not in direct contact with the first deformation portion 124 and the second deformation portion 144.

A shape of the sensor formed by the input portion 12, the output portion 14, and the transmission portion 16 is not limited to a rectangular shape when viewed in the up-down direction. In alternative aspects, the shape of the sensor formed by the input portion 12, the output portion 14, and the transmission portion 16 can be square, rhombic, circular, elliptical, or the like when viewed in the up-down direction.

The transmission portion 16 in the reference state has a flat shape. However, the transmission portion 16 in the reference state may be bent upward or downward, or may be twisted in alternative exemplary aspects.

In the deformation amount detection device 1, a protective film may be attached to the transmission portion 16. With adjustment of a size and a material of the protective film, it is possible to adjust a relationship between a deformation amount from the reference state of the transmission portion 16 and an output signal. A protective film may be attached to an inner peripheral surface of the transmission portion 16 in a bent state. The protective film in this case is preferably formed of a hard resin such as PET or polycarbonate. A protective film may be attached to an outer peripheral surface of the transmission portion 16 in the bent state. The protective film in this case is preferably formed of a soft resin such as urethane. With these configurations, when the transmission portion 16 is bent, stretching stress acts on the transmission portion 16.

The deformation amount detection device 1 may be used for detection of swelling of a battery, described below. For example, a battery may deform to swell over a long period of time of months to years. It is difficult for a typical sensor to detect such deformation over a long period of time. Thus, the transmission portion 16 of the deformation amount detection device 1 may be attached to a surface of a battery. Then, the signal input unit 17 may periodically apply an input signal to the input portion 12 to test whether there is swelling of the battery.

In the deformation amount detection device 1, when an input timing of an input signal is caused to be different from an output timing of an output signal (that is, in a case where time division is performed), the second electrode 140 and the fourth electrode 142 are not essential components. The input portion 12 including the first electrode 120 and the third electrode 122 can be used also as an output portion. That is, the input portion 12 receives a returning elastic wave that returns to the input portion 12 after being input from the input portion 12, being transmitted through the transmission portion 16, and reaching an end portion to be reflected. Therefore, the transmission portion 16 enables transmission of an elastic wave from the first deformation portion 124 to the transmission portion 16, and transmission of a reflection wave of the elastic wave from the transmission portion 16 to the first deformation portion 124. Specifically, the transmission portion 16 transmits an elastic wave from the first deformation portion 124, as a reflection wave, to the first deformation portion 124. The first deformation portion 124 is deformed by the reflection wave to generate an output signal to the first electrode 120. In this manner, the input portion 12 operates as an output portion.

In the deformation amount detection device 1, a uniaxial stretching direction (e.g., an orientation direction) of the film 150 may form an angle other than 45 degrees with respect to the left-right direction. A uniaxial stretching direction (e.g., an orientation direction) of the film 150 may be parallel to the left-right direction.

DESCRIPTION OF REFERENCE SYMBOLS

1: Deformation amount detection device
12: Input portion
14: Output portion
16: Transmission portion
17: Signal input unit
18: Detection unit
120: First electrode
122: Third electrode
124: First deformation portion
140: Second electrode
142: Fourth electrode
144: Second deformation portion
150: Film

What is claimed:

1. A deformation amount detection device comprising:
an input portion that includes a first deformation portion and a first electrode disposed;
an output portion including a second deformation portion and a second electrode disposed;
a transmission portion disposed between the input portion and the output portion, the transmission portion comprising a flexibility to be deformed and being configured to transmit an elastic wave from the first deformation portion to the second deformation portion; and
a detection unit,
wherein the input portion further includes a third electrode and the output portion further includes a fourth electrode,
wherein the first deformation portion is configured to be deformed in response to an input signal applied to the first electrode and to generate the elastic wave,
wherein the second deformation portion is configured to be deformed by the elastic wave and to generate an output signal to the second electrode,
wherein the first deformation portion, the second deformation portion and the transmission portion share a piezoelectric film,
wherein the first electrode is disposed on a first side of the piezoelectric film and the third electrode is disposed on a second side of the piezoelectric film opposite the first side of the piezoelectric film, such that the first and third electrodes face each other in an up-down direction with the piezoelectric film sandwiched therebetween,
wherein the second electrode is disposed on the first side of the piezoelectric film and the fourth electrode is disposed on the second side of the piezoelectric film, such that the second and fourth electrodes face each other in the up-down direction with the piezoelectric film sandwiched therebetween, and
wherein the first electrode and the second electrode are spaced apart from each other on the first side of the piezoelectric film and the third electrode and the fourth electrode are spaced apart from each other on the second side of the piezoelectric film, such that the first and second sides of the piezoelectric film at the transmission portion are not covered by the first and second electrodes and the third and fourth electrodes, respectively, in the up-down direction.

2. The deformation amount detection device according to claim 1, wherein the first electrode, the second electrode, the third electrode and the fourth electrode are each planar conductor layers having a rectangular shape in a plan view thereof.

3. The deformation amount detection device according to claim 1, wherein the first deformation portion, the second deformation portion, and the transmission portion are formed as a single film.

4. The deformation amount detection device according to claim 1, wherein the first deformation portion is configured to be deformed in response to the input signal as having a periodically changing voltage, such that the first deformation portion repeatedly stretches and compresses in a left-right direction.

5. The deformation amount detection device according to claim 4, wherein the second deformation portion is configured to be deformed in response to the elastic wave, such that the second deformation portion repeatedly stretches and compresses in the left-right direction when the elastic wave is transmitted by the transmission portion.

6. A deformation amount detection device comprising:

a first deformation portion with a first electrode and a third electrode disposed thereon, the first deformation portion configured to generate an elastic wave in response to an input signal applied to the first electrode that deforms the first deformation portion;

a second deformation portion with a second electrode and a fourth electrode disposed thereon, the second deformation portion configured to generate an output signal to the second electrode in response to the elastic wave that deforms the second deformation portion;

a transmission portion disposed between the first and second deformation portions, the transmission portion comprising a flexibility to be deformed and configured to transmit the elastic wave from the first deformation portion to the second deformation portion; and a detection unit configured to detect a stretching amount of the transmission portion based on electrical parameter included in the output signal and a reference state of the transmission portion, wherein the first deformation portion, the second deformation portion and the transmission portion share a piezoelectric film, wherein the first electrode is disposed on a first side of the piezoelectric film and the third electrode is disposed on a second side of the piezoelectric film opposite the first side of the piezoelectric film, such that the first and third electrodes face each other in an up-down direction with the piezoelectric film sandwiched therebetween, wherein the second electrode is disposed on the first side of the piezoelectric film and the fourth electrode is disposed on the second side of the piezoelectric film, such that the second and fourth electrodes face each other in the up-down direction with the piezoelectric film sandwiched therebetween, and wherein the first electrode and the second electrode are spaced apart from each other on the first side of the piezoelectric film and the third electrode and the fourth electrode are spaced apart from each other on the second side of the piezoelectric film, such that the first and second sides of the piezoelectric film at the transmission portion are not covered by the first and second electrodes and the third and fourth electrodes, respectively, in the up-down direction.

7. The deformation amount detection device according to claim 6, wherein the first electrode, the second electrode, the third electrode and the fourth electrode are each planar conductor layers having a rectangular shape in a plan view thereof.

8. The deformation amount detection device according to claim 6, wherein the first deformation portion is configured to be deformed in response to the input signal as having a periodically changing voltage, such that the first deformation portion repeatedly stretches and compresses in a left-right direction.

9. The deformation amount detection device according to claim 8, wherein the second deformation portion is configured to be deformed in response to the elastic wave, such that the second deformation portion repeatedly stretches and compresses in the left-right direction when the elastic wave is transmitted by the transmission portion.

10. The deformation amount detection device according to claim 1, wherein the detection unit is configured to detect a stretching amount of the transmission portion based on an electrical parameter included in the output signal from the output portion and a reference state of the transmission portion.

11. The deformation amount detection device according to claim 1, wherein the detection unit is configured to detect the stretching amount in one of: (i) a left-right uniaxial stretching direction of the transmission portion relative to the input portion and the output portion, or (ii) a front-back uniaxial stretching direction of the transmission portion relative to the input portion and the output portion.

12. The deformation amount detection device according to claim 1, wherein the detection unit is configured to detect an angle θ of the transmission portion.

13. The deformation amount detection device according to claim 10, wherein the electrical parameter comprises at least one of a resonance frequency, a Q factor, and an amplitude of the output signal.

14. The deformation amount detection device according to claim 1, wherein the input signal comprises a voltage that periodically changes.

15. The deformation amount detection device according to claim 13, wherein at least one of the resonance frequency, the Q factor, and the amplitude are based on frequency characteristics of 100 kHz or less.

16. The deformation amount detection device according to claim 14, wherein at least one of the resonance frequency, the Q factor, and the amplitude are based on frequency characteristics between 13 kHz and 20 kHz.

17. The deformation amount detection device according to claim 1, wherein the piezoelectric film comprises one of chiral polymer or polyvinylidene fluoride.

18. The deformation amount detection device according to claim 1, wherein the first electrode, the second electrode, the third electrode and the fourth electrode are each planar conductor layers having a shape formed as a substantially continuous conductive surface within an internal region enclosed by an outer periphery line in a plan view thereof.

19. The deformation amount detection device according to claim 6, wherein the detection unit is configured to detect the stretching amount in one of: (i) a left-right uniaxial stretching direction of the transmission portion relative to the input portion and the output portion, or (ii) a front-back uniaxial stretching direction of the transmission portion relative to the input portion and the output portion, and wherein the electrical parameter comprises at least one of a resonance frequency and a Q factor of the output signal.

20. A deformation amount detection device comprising:

an input portion that includes a deformation portion;

a transmission portion that enables transmission of an elastic wave from the deformation portion to the transmission portion and transmission of a reflection wave of the elastic wave from the transmission portion to the deformation portion, the transmission portion having a flexibility that configures the transmission portion to be deformed from a reference state; and a detection unit, wherein the deformation portion and the transmission portion share a piezoelectric film, wherein the input portion includes a pair of electrodes that face each other in an up-down direction with the piezoelectric film sandwiched therebetween, wherein the deformation portion is configured to be deformed in response to an input signal applied to the pair of electrodes and to generate the elastic wave, and wherein the pair of electrodes are on first and second sides of the piezoelectric film, respectively, in the up-down direction at the input portion and do not cover the piezoelectric film in the up-down direction at the transmission portion.

* * * * *